United States Patent
Carlsson et al.

(10) Patent No.: US 10,271,175 B2
(45) Date of Patent: Apr. 23, 2019

(54) METHODS AND DEVICES FOR PROVIDING, RECEIVING OR MANAGING MAPS

(75) Inventors: Richard Carlsson, Stockholm (SE); Staffan Larsson, Uppsala (SE); Hjalmar Olsson, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1073 days.

(21) Appl. No.: 14/354,977

(22) PCT Filed: Nov. 1, 2011

(86) PCT No.: PCT/SE2011/051299
§ 371 (c)(1),
(2), (4) Date: Apr. 29, 2014

(87) PCT Pub. No.: WO2013/066221
PCT Pub. Date: May 10, 2013

(65) Prior Publication Data
US 2014/0274137 A1    Sep. 18, 2014

(51) Int. Cl.
*H04W 4/00* (2018.01)
*H04W 4/02* (2018.01)
*G06F 17/30* (2006.01)

(52) U.S. Cl.
CPC ...... *H04W 4/025* (2013.01); *G06F 17/30241* (2013.01); *H04W 4/02* (2013.01)

(58) Field of Classification Search
CPC .................................................. H04W 4/02
(Continued)

(56) References Cited

U.S. PATENT DOCUMENTS

2007/0233734 A1* 10/2007 Jendbro ............... G01C 21/20
2007/0257792 A1* 11/2007 Gold ..................... G06Q 30/02
340/539.2
(Continued)

FOREIGN PATENT DOCUMENTS

GB          2456909 A      8/2009
WO      2008008724 A2      1/2008
(Continued)

OTHER PUBLICATIONS

Unknown, Author, "Google Maps", Wikipedia, Available online at: URL:https://en.wikipedia.org/w/index.php?title=GoogleMaps&oldid=457551154#Google_Maps_for Mobile, Oct. 26, 2011, 1-18.
(Continued)

*Primary Examiner* — Omoniyi Obayanju
(74) *Attorney, Agent, or Firm* — Murphy, Bilak & Homiller, PLLC

(57) ABSTRACT

A method for retrieving maps from a map server is disclosed where, as an intermediate step, map meta-data is requested on the basis of which one or more map can later be selected. Map meta-data on the basis of location data, indicating the location of the user device, and map criteria, specifying at least one condition for selecting maps which may be entered manually or automatically into a user device. The request is sent to a map server where a search for map meta-data matching the received location data and map criteria is executed. In case of at least one match between the map meta-data, the location data and the map criteria, map meta-data associated with at least one map is provided to the user device, such that the user device can select at least one map, which can be acquired from the map server, at least partly on the basis of the retrieved map meta-data.

13 Claims, 8 Drawing Sheets

(58) Field of Classification Search
USPC .................................................... 455/456.2
See application file for complete search history.

(56) References Cited

U.S. PATENT DOCUMENTS

| | | |
|---|---|---|
| 2008/0077642 A1 | 3/2008 | Carbone et al. |
| 2008/0288166 A1* | 11/2008 | Onishi ................... G01C 21/20 |
| | | 701/533 |
| 2010/0010737 A1 | 1/2010 | Pyo |
| 2012/0019513 A1* | 1/2012 | Fong ................... G01C 21/3673 |
| | | 345/419 |
| 2013/0110841 A1* | 5/2013 | Sathish ............. G06F 17/30038 |
| | | 707/741 |

FOREIGN PATENT DOCUMENTS

| | | |
|---|---|---|
| WO | 2009145609 A1 | 12/2009 |
| WO | 2010103176 A1 | 9/2010 |

OTHER PUBLICATIONS

Unknown, Author, "NASA World Wind", Wikipedia, Available online at: https://en.wikipedia.org/w/index.php?title=NASA World Wind&oldid=457897624, Oct. 28, 2011, 1-7.

* cited by examiner

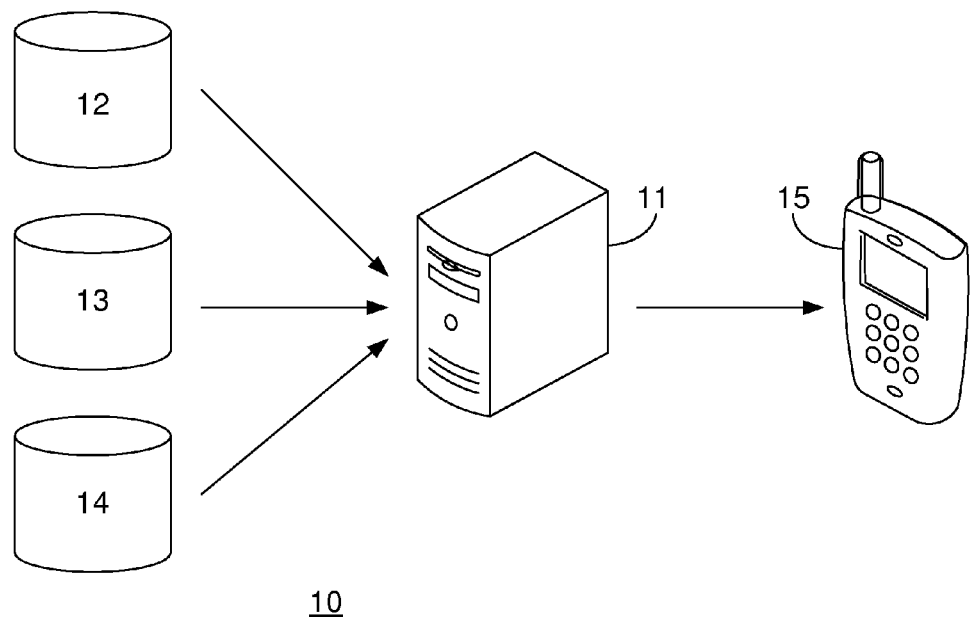
Figure 1 (Prio Art)
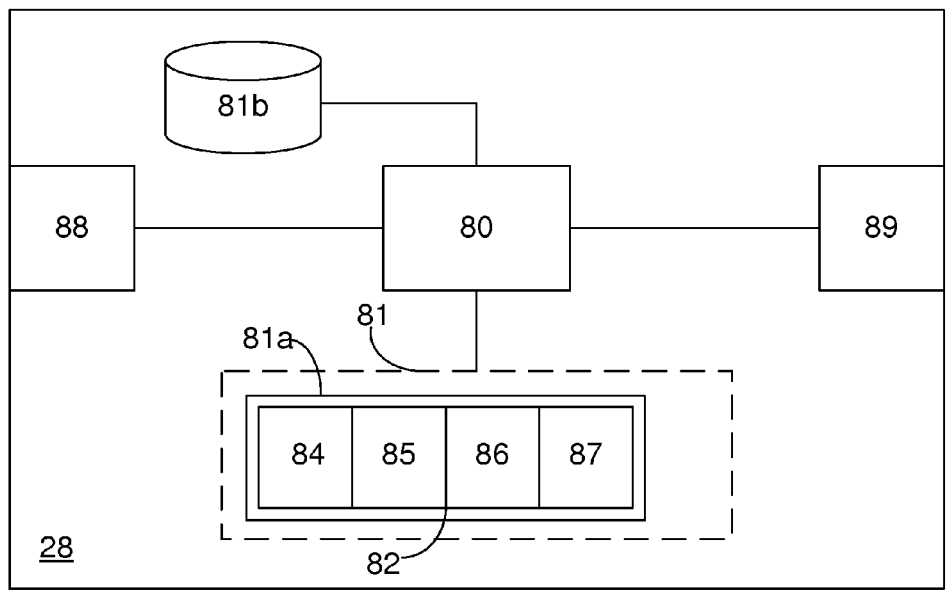
Figure 8

METHODS AND DEVICES FOR PROVIDING, RECEIVING OR MANAGING MAPS

TECHNICAL FIELD

The present document relates to methods of providing maps to a user device, of selecting maps at a user device, of managing maps in a map database and to devices and computer program products capable of executing these methods.

BACKGROUND

The increasing availability of smart phones equipped with GPS and powerful processors, such as e.g. Android phones, has provided for a large and increasing market for LBS (Location-Based Services). This is a type of services that create end-user value based on information that is closely tied to geographical location data. Many LBS based applications strongly rely on the availability of digital maps.

One factor that has contributed to the great success of LBS is the public availability to maps and APIs (Application Programming Interfaces) which are configured to provide access to, and to enable users to build applications that utilize these maps. These options have made it possible for any developer with at least some basic programming skills to create LBS applications that can deliver great value to its users.

Up until recently almost all available LBS have been targeted for outdoor use. Recent development in positioning technology and map creation tools have however started to enable LBS focused also on indoor use. In addition, an increasing number of maps describing indoor locations have also recently been made available to the public.

There are various strategies to be used for creating indoor maps. One way, which may be referred to as surveying, rely on personnel which is instructed to survey buildings, typically assisted with survey tools, such as e.g. laser or radar equipment, and to draw up maps based on those surveys.

Alternatively, map providers may apply sourcing of building schematics, which can be achieved by setting up deals with property owners, such that property can be mapped to provide descriptive schematics and drawings which make up maps of the respective properties.

Crowd sourcing is yet another alternative way of providing maps where map providers encourage the public to use their available tools to draw up maps of different locations that might be of public interest. These maps are then stored in a proprietary format specified by the map provider and made available to map developers, such that the map providers can use this data to create various types of LBS applications that will be applicable in mapped locations.

Available outdoor LBS normally rely on the widespread availability of digital maps. These digital maps are typically produced and provided by large companies that use a combination of manual surveying and purchasing of government provided information to create and provide detailed geographical maps. When it comes to indoor maps, however, there are at least two big challenges when it comes to management and distribution of such maps.

One problem with maps displaying indoor locations is that no central repository of information about the locations exists. Building schematics and layouts of different properties, or even the same property, are often owned by different companies, such as e.g. constructing companies, building owners or companies responsible for the maintenance of the buildings. Such information is in most cases not made available to the public and consequently there is no central storage where this information can be accessed. The companies that have made an effort in assembling this type of information so as to be able to create maps of indoor locations are normally using their own proprietary map technologies, thereby leaving a developer who wants to build LBS applications based on the same information with the only option of relying on the map technology presently used and provided by the respective company, if that technology is at all made available for external use.

Another problem with the described type of map providing systems, such as e.g. systems based on crowd sourcing, where a lot of different persons contribute in creating maps, is that it is difficult to control which map that should be used by which application. Many users may have provided a range of different maps for the same building or for the same section of a building. In each situation there is generally one available map that is more suitable than the rest, depending on the circumstances, e.g. due to having the best quality for the required task, while in other case other maps may be more useful and illustrative. A map optimized for real-estate maintenance or security personnel will e.g. most certainly in most cases not be the most suitable map for mall customers wanting to know where to find a specific product.

A typical well known system which is configured to manage and make available maps to mobile users is schematically illustrated in FIG. 1, where the system 10 comprises a map server 11 which is connected to a plurality of map databases 12,13,14, containing a plurality of maps, such that all maps available from the map databases 12,13,14 a can be exposed, typically via an API, and made accessible to user devices 15 from the map server 11. An en user may access and use stored maps by connecting to the API of map server 11 from a map application running on the user device 15.

One problem when implementing a solution as suggested in FIG. 1 is to be able to configure a map server that can provide maps which are suitable for a vide variety of different types of map related applications and services. When an application requests map data from a map server, the map server will typically provide information about the geographical location for which the end-user requires a map. If there are multiple maps available in one location it is up to the end-user to use his judgment to decide which map is the most suitable from one situation to the other. However, it is often very difficult to determine which map that is the most suitable one, and one can often not judge whether the selected map was an appropriate one before having used the selected map for a while.

It is also very difficult to design a map server that is suitable for handling all types of map related applications. While one type of applications may be adapted to select maps which provide the best information about certain products in different retail stores, another type of applications may be adapted to select maps based on previous usage of the maps, e.g. on the basis of users comments and/or ratings, while yet another type of applications may instead be adapted to provide maps specifically provided by one or more specific supplier. All these various demands raise a need for a map server which is configured such that it provide for a more flexible and efficient map selection approach.

SUMMARY

An object of this document is to address at least some of the problems mentioned above. More specifically, one object is to provide maps to a user device, while another object is to retrieve maps at a user device from a map server, and yet another object is to manage such map data.

According to one aspect, a method to be executed in a map server for providing maps to a user device is provided. The method is initiated by receiving a request for map meta-data from the user device, where the request comprises at least one map criterion, specifying at least one condition for selecting maps, and location data, indicating the location of the user device. The location data may be provided in the request or as a separate message. In response to such a request, a search for map meta-data matching the received location data and the at least one map criterion is executed in a map meta-data database, and, in case of at least one match between the map meta-data, the location data and the at least one map criterion, map meta-data associated with at least one map is retrieved from the map meta-data database. The retrieved meta-data is then provided to the user device, thereby enabling the user device to select at least one map from the map database, via the map server, at least partly on the basis of the retrieved map meta-data.

More specifically, once one or more maps have been selected at the user device and requested from the map server, the map server responds to such a request by acquiring the one or more requested maps from a map database, and providing the requested one or more maps to the user device.

Consequently, an intermediate step, preceding the step of selecting a map, is introduced where information, here referred to as map meta-data, which can describe selectable maps from various aspects, is requested, prior to selecting any map.

An advantage of providing map meta-data to the user device in an intermediate step, before providing any maps, is that a user, or an application running on a user deice, will be able to select a most suitable map with the help of the provided map meta-data.

According to one alternative embodiment of the method according to the first aspect, the situation where there is no match between the map meta-data, the location data and the map criteria, may be handled by, instead of retrieving map meta-data in response to receiving a request from a user device, retrieving map criteria available for the indicated location, and providing the available map criteria to the user device, thereby enabling the user device to repeat a requesting for map meta-data on the basis of the location data and at least one of the available map criteria.

According to a second aspect, a method executed by a user device for retrieving maps from a map server is provided. The method is initiated by recognizing location data, specifying the location of the user device, and at least one map criterion, specifying at least one condition for selecting maps, at the user device. In response, the user device transmits a request for map meta-data, comprising the at least one map criterion and the location data to a map server capable of accessing maps from a map database. The described request initiates a search for map meta-data matching the obtained location data and the at least one map criterion at the map server. In case of at least one match between the meta-data, the location data and the at least one map criterion, map meta-data associated with at least one map, is then received from the map server, thereby enabling the user device to select at least one map, at least partly on the basis of received map meta-data.

According to one embodiment of the method according to the second aspect, in case of no match in the search for map meta-data, map criteria available for the indicated location may be received from the map server, instead of map meta-data, which when processed by the user device enables the user device to repeat a requesting for map meta-data on the basis of the location data and at least one of the available map criteria.

According to yet another embodiment of the method according to the second aspect, subsequent to receiving matching map meta-data, the user device may process the map meta-data, and initiate a dialogue between the user device and the map server, thereby enabling a user of the user device to interact with the map server and to select and request at least one map via the dialogue. By providing such a dialogue, one or more maps may be manually selected in an interactive process, aiming at providing the most optimal map or maps.

Alternatively, the map meta-data may be processed such that at least one map can be automatically selected and requested by the user device.

According to a third aspect, a method to be executed in a map processing engine for managing maps and for making the maps available to a user device via a map server is provided, This method is initiated by retrieving updated or new map data associated with a map from at least one map data source and by converting the retrieved map data into a common data format. In addition, map meta-data associated with the map is extracted from at least a first map meta-data source and/or the at least one map data source, after which the extracted map meta-data is arranged such that it is linked to the associated map data. The map data is then stored in a map database and the extracted meta-data is stored in a map meta-data database, thereby enabling a user device to select maps assembled from map data retrievable from the map database at least partly on the basis of associated map meta-data, retrievable from the map meta-data database.

The map meta-data may comprise various data, such as e.g. one or more of information on: the author of the map, the provider of the map, the date of creation of the map, the date of the last update of the map, the location of the map, types of Points Of Interests included in the map, the file size of the map, key words and/or tags representative of the map.

According to an alternative embodiment of the method according to the third aspect, in addition to the map meta-data mentioned above, further map meta-data, available from at least a second meta-data source, giving information on the usage of stored maps, may also be accessible to the map processing engine. Such further map meta-data may comprise at least one of: historical usage statistics of the map, rating information on the map, rating information on the author of the map and information on restrictions on usage of the map.

A method of updating databases according to any of the embodiments above may be repeated at a pre-defined time interval. In addition, or as an alternative a method may be repeated at the occurrence of at least one pre-defined triggering event, such that e.g. when new map data is added to a data source.

According to a fourth aspect a map server is provided which comprises a processor and a memory capable of storing instructions which when executed by the processor causes the processor to recognize a request for map meta-data, received from a user device, the request comprising at least one map criterion, specifying at least one map selecting condition, and location data, indicating the location of the user device; search, in a map database accessible to the map server, for map meta-data matching the location data and the at least one map criterion; retrieve, in case of at least one match between the map meta-data, the location data and the at least one map criterion, from a map meta-data database, map meta-data associated with at least one map, and to provide the retrieved map meta-data to the user device. In addition the instructions are capable of causing the processor to receive a request for at least one map from the user device, where the at least one map has been selected at least partly on the basis of the map meta-data; to acquire the one or more requested maps and to provide the acquired map or maps to the user device.

The memory may also be capable of storing instructions which when executed by the processor causes the processor to: retrieve map criteria available for the indicated location, and to provide the available map criteria to the user device, in case of no match between the map meta-data, the location data and the at least one map criterion, thereby enabling the user device to repeat a requesting for map meta-data on the basis of the location data and at least one of the available map criteria.

In addition, the memory may further be capable of storing computer readable instructions which when executed by the processor causes the processor to make an API (Application Programming Interface), which may e.g. be a RESTful Application Programming Interface, accessible to the user device, thereby enabling for the user device to communicate with the map server via the API. The API provides for a user friendly interface and efficient processing of map meta-data in order to filter out the most suitable ma or maps.

According to a fifth spect a computer program product comprising computer readable code means and a compute program is disclosed which is configured to cause the processor to perform the steps described above when the computer program is executed on the map server.

According to a sixth aspect, a user device comprise a processor and a memory capable of storing instructions which when executed by the processor causes the processor to: recognize location data, specifying the location of the user device, and at least one map criterion, specifying at least one condition for selecting a map and to transmit, to a map server capable of accessing maps from a map database, a request for map related map meta-data, comprising the at least one map criterion, and the location data, thereby initiating, at the map server, a search for map meta-data matching the location data and the at least one map criterion. The processor may also be caused to receive, from the map server, map meta-data associated with each match, in case of at least one match between the location data and the at least one map criterion; to select at least one map, at least partly on the basis of the map meta-data, and to request the at least one selected map from the map server, before receiving the one or more requested maps from the map server.

In addition, the memory may further be capable of storing instructions which when executed by the processor causes the processor to receive, from the map server, map criteria available for the indicated location, and to process the available map criteria, thereby enabling the user device to repeat a requesting for map meta-data on the basis of the location data and at least one of the available map criteria, in case of no match in the search for map meta-data.

Furthermore, the memory may be further capable of storing instructions which when executed by the processor causes the processor to initiate a dialogue between the user device and the map server subsequent to recognizing a match, thereby enabling an end-user of the user device to interact in the map selection via the dialogue, where such a dialogue may e.g. be initiated upon recognizing the occurrence of at least one pre-defined dialogue triggering event.

The user device described above may be e.g. any of: a mobile telephone, a smart phone, a tablet, a desktop, a laptop, a notebook, a multimedia player, a set-top box, a TV and a computer.

According to a seventh aspect, a computer program product comprising computer readable code means and a compute program is also be provided which is configured to cause the mentioned processor to perform the mentioned steps when the computer program is executed on the user device.

According to an eighth aspect map processing engine is provided which comprise a processor and a memory, where the memory is capable of storing instructions which when executed by the processor causes the processor to: retrieve, from at least one map data source, updated or new map data associated with a map; convert the retrieved map data into a common data format; extract, from at least one of a first map meta-data source and the map data source, a first set of map meta-data associated with said map data; map the extracted map meta-data with the associated map data, and store the map data in a map database, and the extracted map meta-data in a map meta-data database, thereby enabling a user device to select maps assembled from map data retrievable from the map database at least partly on the basis of associated map meta-data, retrievable from the map meta-data database.

The memory of the map processing engine may also be capable of storing instructions which when executed by the processor causes the processor to extract, in addition to the first set of map meta-data, a second set of map meta-data from at least one second map meta-data source.

The memory may be capable of storing instructions which when executed by the processor causes the processor to repeatedly retrieve new or updated map data at a pre-defined time interval, and/or to retrieve new or updated map data upon recognizing the occurrence of at least one pre-defined map triggering event.

According to a ninth aspect also a computer program product comprising computer readable code means and a computer program is provided, which is configured to cause the processor to perform the steps described above when the computer program is executed on the map processing engine.

Further details and examples relating to the embodiments described above will now be described in further detail below.

BRIEF DESCRIPTION OF THE DRAWINGS

The objects, advantages and effects, as well as features of the embodiments described herein will be more readily understood from the following detailed description when read together with the accompanying drawings, in which:

FIG. 1 is an overview of a prior art system for managing and providing maps.

FIG. 8 is a simplified architecture of a map server, according to one embodiment.

DETAILED DESCRIPTION

Figure 2:
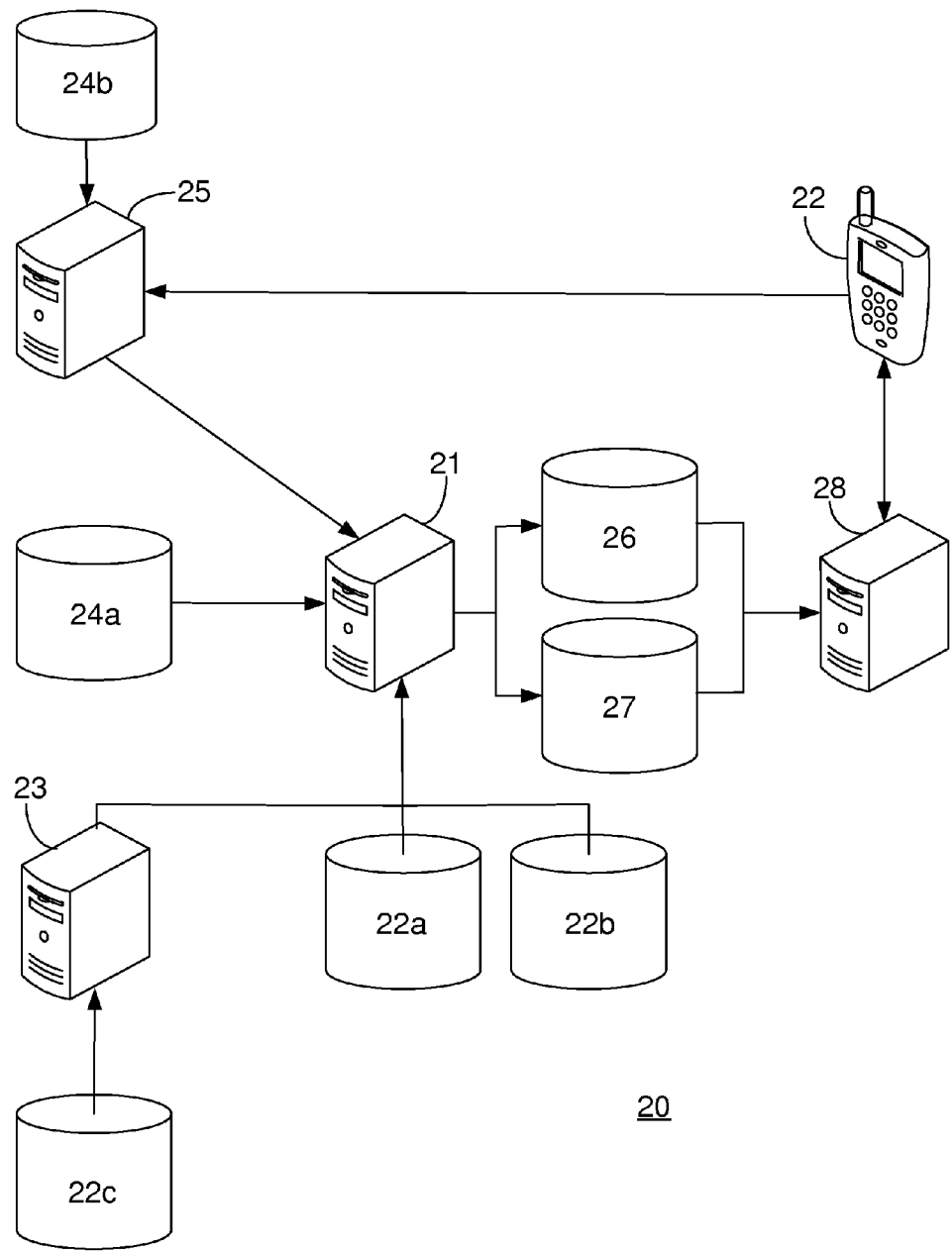
FIG. 2 is an overview of a system for managing and providing maps, according to one embodiment.

The challenges mentioned above creates a large need for a system that can manage and distribute digital maps, and particularly indoor maps, made available from different sources, to mobile devices through a single access point. There is also a need for a system which can provide for widespread development of applications and services that rely on this kind of information and easy and user friendly downloading of maps available from various locations, while at the same time assuring that the maps are continuously adapted to the current situation and application context. Selection of maps shall also be possible while requiring a minimum of effort from the end-user.

As will be described in further detail below, with references to the respective figures, a system is provided which is capable of collecting maps from multiple different sources, which may be geographically distributed and belong to different providers. All collectable maps are tagged with various categories of meta-data, from hereinafter referred to as map meta-data, which is map related data, such as e.g. information on the creator of a specific map, a purpose or category of a map, or the creation date of a map. Map meta-data associated with a respective map may refer to one category of data, but will typically comprise aggregated data of different categories. The maps together with the associated map meta-data are then made available to developers who want to create new LBS applications, which can then be made available via a map server, typically comprising an API, providing end-users with a user friendly interface towards the map server.

The map server provides access both to map content and to any associated map meta-data that is made available from a meta-data source or directly from the map data, where the accessible information can be used by any application residing on a user device and relying, to at least some extend, on the use of maps.

Instead of just downloading a map which seems to comprise required map data from a map server when executing an application on a user device, a method which includes an intermediate selection of filtering of map meta-data is initiated at the user device, before any selection of maps will commence. By making a request to the map server an application residing on the user device will be able to initiate downloading of a list of map meta-data, describing in some sense one or more maps matching a certain query. A broad request could e.g. be a request for all maps available in one location, while a more narrow, or detailed request, comprising more or less detailed limitations, would result in a more or less detailed filtering of the map meta-data available for a given geographical location. In the former case more effort may be on the application or end-user which may then make use of all available map meta-data to select which of the associated maps should be used in the present situation, while in the latter case, a lot of maps may have been filtered out already at the stage of arranging the map-meta-data, and less effort will be required from the application or end-user to select the maps based on the obtained map meta-data. In certain cases just a few maps, or even only one map, may be left to choose from. Thereby a more sophisticated mechanism for selecting the most suitable map or maps for each unique situation is provided, by applying an intermediate step for indirectly filtering out suitable maps, before requesting a specific map.

One typical application where one can benefit from being able to efficiently select from a range of available maps of different origin and with different content is when being located in an airport. When an end-user starts an application from his user device he may be prompted to fill in information, in the present context referred to as map criteria, which may include e.g. what flight he is about to board, boarding time and if there are any special requirements needed. Depending on the entered map criteria together with the remaining time until boarding, the system can then provide different suitable maps. If it for example is close to departure it may be wise to present a slimmed map where only gates are shown, so that the end-user can quickly find his way to the correct gate. The application can then query the system for a map that has the most relevant information, which in the present case would be the gate information, but omits further details. If more than one map is provided as a response to such a request e.g. the most popular of these maps may be presented as the prioritized one. Even though the term map criteria is used throughout the document, it is to be understood that the information used for selecting map meta-data does not have to comprise a plurality of map criteria, but may also comprise only one map criterion, depending on the application and the type of maps required.

If, on the other hand, there is plenty of time left until departure, the application may instead request for a map containing more detailed airport information, such as e.g. store and restaurant information. Other selectable map criteria may e.g. include alternative routes available if handicap assistance is required or lounges available for premium membership holders.

The application may also be configured so that it continuously return feedback data to the system, providing statistics on usage of the maps, such as e.g. which maps that have been selected by the end-users, and to what extent they have been used. This type of map related data constitutes one type of external map meta-data which may e.g. be managed and made available to the system by certain usage data providers.

Another use case may be where a large retail company has had an application developed and made available to its customers where the customers are assisted on their way in the retail stores e.g. by receiving advertising messages while being assisted by a map when shopping. Such an application may be configured such that the end-user is always provided with maps from the retailer when in a store of the retailer firm, while when in other locations, such as e.g. a museum or a school, other, more relevant maps may be provided to the end-user instead.

One advantage with using an application, such as anyone of the ones described above, is that an end-user will be able to dynamically select the map which is best suited for the current situation from all maps available at a certain location according to preferred map criteria. An application may be configured to select a map automatically by applying predefined map criteria to select map meta-data, on the basis of which a map is later selected, or let the end-user select which map to use based on map meta-data presented in response to a request comprising map criteria manually entered by the end-user.

Since the server application specifies a query for a specific location, typically in combination with further map criteria, only relevant map meta-data needs to be transmitted to the application for processing, i.e. for making the map meta-data available in a user friendly way to an end-user via a graphic user interface, or for making the map meta-data available to an application running on the user device, in case automatic map selection is applied. Thereby the amount of processing required at the user device can be kept at a minimum, since most of the processing required for filtering out map meta-data is executed at the map server. In addition, only selected parts of map meta-data may be presented to the end-user, thereby simplifying the map selecting process for the end-user.

Furthermore, maps from different map providers may be provided by one single common API, which enables simplification of the map selection process, as well as the processing of the map related data.

Developers will more easily be able to make use of maps, and in particular, indoor maps, with their specific requirements, without having to select in advance any specific map data provider they want to use.

Map providers will also be able to publish their maps in one common API, which enables also small data providers, who for instance only provide data for one city, to make their maps available in a system which can provide global coverage. Thereby end-users will have a wide variety of applications from different developers to choose from, from one situation to the other.

A system which is configured to manage maps and map related data, and to make such information easily accessible to end-users as explained in general terms above, will now be described in more detail according to one possible embodiment with reference to FIG. 2.

Although we refer to devices and methods which are particularly suitable for indoor maps, and the demands raised in indoor locations, it is to be understood that the examples following below may also be applicable also for map data providing outdoor maps.

The system 20 comprises a server, from hereinafter referred to as a map processing engine 21, which is a server that is configured to process data accessible from various external and internal map data and map meta-data sources, such that the processed map related data is made accessible to user devices, here represented by user device 22, via another server, from hereinafter referred to as a map server 28, providing access to the map related data. The map processing engine 21 is operatively connected to one or more map data source, here represented by two internal map data sources 22a, 22b, i.e. map data sources directly controlled from the map processing engine 21, and an external map data source 22c, i.e. a map data source maintained by a third party map provider, where the latter is in the present example accessible via an intermediate access node, here referred to as an external provider server 23.

The map data sources 22a,22b,22c contain map data, i.e. data making up complete maps, which is typically provided in various proprietary formats if provided from various different map data suppliers (not shown). All these maps are tagged with information indicating the exact locations of the building or buildings that they represent, and may also be tagged with other information, providing various facts which are relevant for the respective map. Typical map data may comprise e.g. basic layout information of buildings, such as e.g. locations of walls, rooms, doors, floors, emergency exits, and positions of specific objects and features in maps, such as e.g. tables, chairs, staircases, security equipment and elevators.

The map processing engine 21 is also operatively connected to one or more map meta-data sources, here represented by two map meta-data sources which may be referred to as an internal map meta-data source 24a and an external map meta-data source 24b, provided from a third party map provider, where the latter map meta-data source 24b is accessible to the map processing engine 21 via an intermediate node, here referred to as a usage feedback server 25. Typically, the internal map meta-data source 24a contain map meta-data indicative of the structure and content of associated maps, while the external map meta-data sources contain map meta-data indicative of the earlier usage of associated maps. More specifically, the usage feedback server 25 is typically configured to collect information from user devices 22 which are using a map related application, such as e.g. information indicative of to which extend each map is being used by the end-users, and to store this information in an external map meta-data source 24b, thereby making also this type of historic map meta data available to the map processing engine 21.

The internal map meta-data may comprise map related information, such as e.g. one or more of: date of creation of the map, date of last update of the map, the author of the map, access rights associated with the map, map data size, map name, supported languages, map type, included POIs (Points Of Interest), as well as one or more key words and/or tags arranged in one or more categories to simplify categorization of the maps, and thereby selection of the maps.

The externally provided map meta-data on the other hand may comprise usage related data, rather than data descriptive of the respective map, where the usage related data is typically collected from the user devices on a continuous basis, and may comprise e.g. one or more of: historic information about how frequently a respective maps have been selected, user ratings of the quality, usability of a map, the author of the map, as well as various information of the map data provider.

By having the system connected to internal as well as external map data and map meta-data sources, a wide variety of map related information can be aggregated, thereby allowing developers to provide more selectable options to the end-users.

A Java EE (Enterprise Edition) platform may e.g. be applied on the respective entities for providing connectivity between the map processing engine 21 and the internal map-data sources 22a, 22b, as well as between the external provider server 23 and the external map data source 22c, while HTTP (Hypertext Transfer Protocol) may be used for providing connectivity between the map processing engine 21 and the intermediate nodes 23,25. It is to be understood that the system may comprise more or less map data sources and/or map meta-data sources than what is illustrated in FIG. 2, depending e.g. on how many providers that are willing to connect to the system.

The map processing engine 21 is configured to process extracted map data and map meta-data, such that map meta-data associated with a specific map is being linked or mapped to the respective map. The system 20 therefore also comprises a map database 26 which is connected to the map processing engine 21 such that after the mapping the described map related data, the map processing engine 21 stores the map data in the map database 26. In a corresponding way, a map meta-data database 27 is connected to the map processing engine 21, such that the map processing engine 21 can store any map meta-data in that database.

Both the map database 26 and the map meta-data database 27 are connected to another server, from hereinafter referred to as a map server 28, e.g. by applying a Java EE platform, such that the map server 28 can provide user devices 22 running a map related application access to the stored map meta-data and associated map data. Typically, the end-user will be able to access the map meta-data and the map data via an API, or more specifically, a specially adapted map API residing on the map server 28.

An end-user wanting to gain access to map meta-data and subsequently also to associated map data, may use a user device, such as e.g. any of: a mobile telephone, typically a smart phone, a computer, a desktop, a multimedia player, a laptop, a notebook, a Tablet, a Set-Top-Box (STB), a TV, a play console, or any other type of user device which is adapted to run an application capable of connecting to the map server 28. The application, which may typically also be referred to as a client, or in the present case more specifically as an indoor LBS client, which is capable of running on the user device, may be any type of application, such as e.g. an Android application, or service which is configured to utilize maps, and particularly indoor maps.

Figure 3:
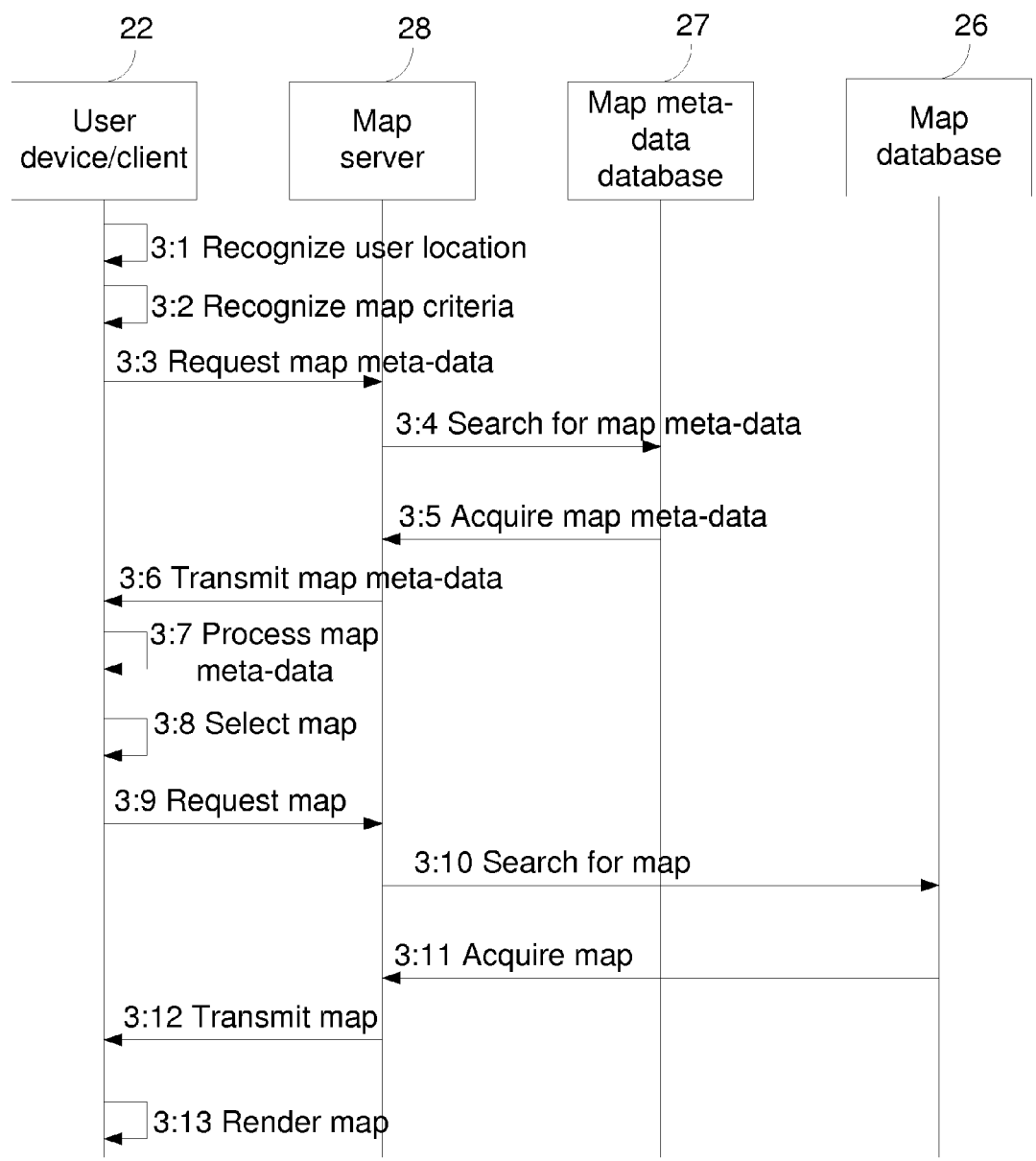
FIG. 3 is a signaling scheme illustrating how maps can be requested and acquired, according to one embodiment.

FIG. 3 is a flow chart illustrating how a client or application executed on a user device may initiate and complete a process for obtaining maps from a map server forming part of a system, such as the one described above.

In a first step 3:1, a process, which may be referred to as a map selecting process, is triggered by a client, i.e. an application or service running in a user device 22, recognizing a user location which might either have been entered manually by an end-user via any type of user interface of the user device 22, or have been determined automatically, e.g. with the help of a GPS function of the user device 22, by, or by cooperation with, the client if the map meta-data and map data is requested automatically by the client. GPS functions are commonly known in the art, also when configured as an integrated part of a user device, and is therefore out of scope of the described method. Therefore it will not be described in any further detail in this document.

In a corresponding way the client recognizes map criteria, which is to be interpreted as an indication on certain conditions on how to filter out relevant map meta-data from the meta-data which is available for the given location. Recognition of map criteria, which is provided either as manually entered, or as automatically derived data, is indicated in a next step 3:2.

If the described process is an automatic process the client may be configured to assemble one or more map criteria which are relevant for the present case. If instead the process is manually managed by an end-user, an option of map criteria, or a set of questions, may instead be displayed to the end-user, such that the end-user can select to enter or indicate required conditions to be applied for an upcoming map meta-data filtering process.

The client may allow a wide variety of map criteria to be selectable by the end-user, and as the amount of available map meta-data increases, the options and possible combinations of selectable map criteria may also increase, thereby making map meta-data and the subsequent map selection even more sophisticated.

In its simplest case, a map criterion constituting an instruction to request for all map meta-data available for the given location may be given, while in a more sophisticated request the provided map criteria may instead comprise one or more, more or less detailed, specifications of what kind of content the map meta-data, and subsequently, the requested map should have. The map criteria may e.g. comprise a request for map meta-data associated with maps showing the shops which are best adapted for disabled persons. Map criteria may also indicate requests, such as e.g. for certain restaurants or shops in a shopping mall, for the highest rated maps or for the most frequently viewed maps at the relevant location.

Map criteria may e.g. request only stores that are presently open or a routing, i.e. how to get from point A to point B, which is adapted to the requesting end-user. In the former case, the map criteria could preferably include an indication of the time obtainable from any conventional internal clock of the user device. In the latter case a security guard will e.g. have access to more doors, and, thus, will have more alternative routes to choose from, than a regular visitor to e.g. an airport, a hospital or a shopping mall.

Once a user location and map criteria have been recognized at the user device 22, this information is provided to a server capable of providing map related information, here referred to as a map server 28. In FIG. 3, both the map criteria and the location data are sent to the map server in one single request, as indicated in another step 3:3. The map criteria and the location data may however alternatively be sent in separate messages. The request for map meta-data may be seen as an instruction, which is based on the map criteria, for the map server on how to filter out map meta-data which is relevant for the location given in the request which is to be applied for the given location.

Once the map meta-data and the location data have been received by the map server 28 it triggers a search for map meta-data, which is executed at a map meta-data database 27, as indicated in a step 3:4, and in a subsequent step 3:5, acquired map meta-data is provided to the map server 28 in a response message. During the search, map meta-data which has been tagged for the given location is filtered out according to the content of the request. How this filtering is executed and the outcome of the filtering will depend on how detailed map criteria that is being provided in the request and the level of detail of the tags provided to the map meta-data when the map meta-data was compiled.

In another step 3:6 the map server 28 transmits the acquired map meta-data to the user device 22, thereby allowing the map meta-data to be processed by the user device 22, as indicated in a subsequent step 3:7. Such a processing may e.g. include presentation of the acquired map meta-data to an end-user in a way which simplifies an upcoming map selecting step. The presentation may e.g. include a dialogue set up between the client run on the user device 22 and the map server 28 which is providing questions to the end-user with the purpose of helping the end-user to make the best selection of a map based on the provided map meta-data. In case of an automatically executed process, an algorithm executed by the client may be configured so that, based on the acquired map meta-data, the most optimal map selection can be executed, while requiring no interaction at all, from the end-user.

After the map meta-data has been processed such that it can be used for selecting a map, as indicated in a step 3:8, a request for the selected map is prepared at the user device 22 and provided to the map server 28, as indicated in a subsequent step 3:9. The request for a map triggers the map server 28 to search for the requested map at a map database 26, and to acquire the map from the map database 26, as indicated in steps 2:10 and 3:11, respectively, after which the acquired map is provided to the user device 22, as indicated in a next step 3:12.

Although, the process described above relates to the selection of one single map, the described process may also allow a plurality of maps to be selected, such that e.g. an end-user may select a plurality of maps based on acquired map meta-data, and once all the acquired maps have been viewed and evaluated, the end-user can make a choice of one preferred map. According to yet another alternative embodiment, a plurality of acquired maps may be stored on the user device 22, such that, at any time when a presently used map does not any longer fulfill the demand of the end-user, he may choose to switch to another map, instead of making a completely new request to the map server. Similarly, the remaining embodiments, which provide examples of methods and devices, also equally may apply to selection of one map, as well as to a plurality of maps from a map server.

As indicated in a final step 3:13 the acquired map, or maps, can be rendered by the client of the user device 22. Alternatively, a dialogue or a refined selection process can commence at this stage, where the client repeats the described process, either from step 3:1 or 3:2, by requesting for a revised set of map meta-data, or from step 3:8, such that, based on the available meta-data, another, more suitable map then the one first selected may be selected, in case a plurality of suitable maps, rather than one prioritized map, were selected in a previous selection made according to step 3:8.

There may be situations where a request which is too narrow, i.e. too detailed compared to the available map meta-data, is provided from the user device 22 to the map server 28. This may e.g. be the situation when an end-user has requested a map indicating Vietnamese restaurants in a shopping mall, which does not host any such restaurant. For such situations, the map server 28 may e.g. be provided with functionality which is capable of assisting the end-user to continue his search for an alternative restaurant, such as e.g. another Asian restaurant, in a user friendly way, instead of just informing the end-user that a request resulted in no corresponding map.

Figure 4:
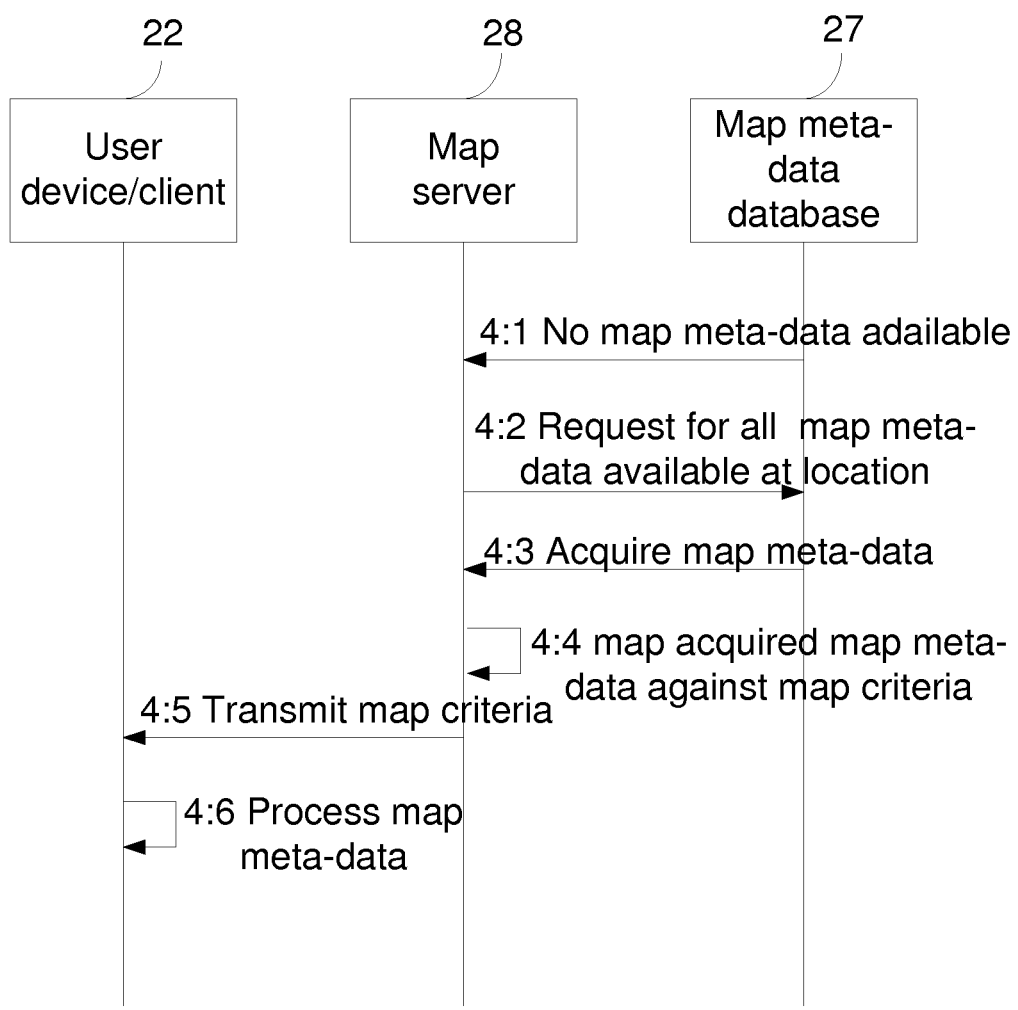
FIG. 4 is another signaling scheme illustrating alternative steps for handling a request for which no map meta-data can be found, according to one embodiment.

FIG. 4 is an illustration of such a process where step 3:5 of FIG. 3 is replaced by a number of alternative consecutive steps, starting with step 4:1, where, in response to finding no matching map meta-data in the map meta data database 27 during filtering, the map server 28 continues the initiated process by making a new request to the map meta-data database 27, according to another step 4:2, where, instead of requesting for map meta-data according to the previous map criteria, a request for all map meta-data available for the given location is provided from the map meta-data database 27. The map meta-data database 27 thereby provides all map meta-data which has been previously tagged to the given location, as indicated in a next step 4:3, and in a subsequent step 4:4, the map server 28 maps all acquired map meta-data against a list of available map criteria which has been previously stored at the map server 28. By filtering out all map criteria for which there is matching map meta-data, all selectable options for the given location is provided. In a next step 4:5, the list of selectable map criteria is transmitted to the user device 22, and in a subsequent step 4:6 the map criteria can be processed at the user device 22 by the client. Based on the processed map meta-data, the end-user can then continue the process of FIG. 3 from step 3:8 by selecting a map based on the relevant map meta-data.

At step 4:6 only map criteria for which there is map meta-data available at the map meta-data database 27 will be provided as selectable options to the user device 22, and, thus, once a new request, comprising map criteria include in the selectable options, is sent from the user device 22 to the map server 28, such a request will result in matching map meta-data being returned to the user device 22. Preferably, in case of a manual process, such an option also includes a dialogue provided to the end-user where the end-user is informed of the resulting first failed request, and provided with available options to be used in the subsequent, more detailed request.

Figure 5:
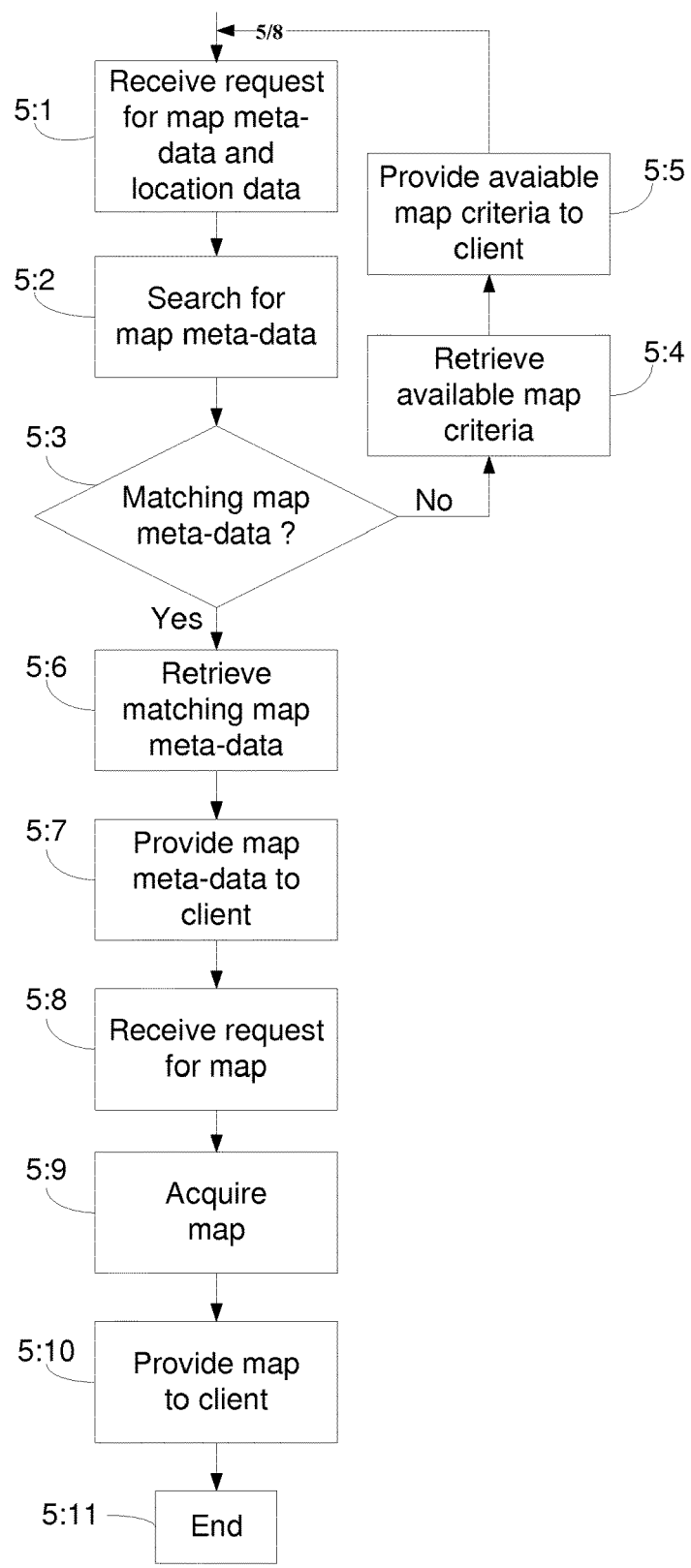
FIG. 5 is a flow chart illustrating a method, executed at a map server, for providing maps to a user device, according to one embodiment

As mentioned above, a request for map meta-data will trigger a method to start at a map server. Such a method for managing a request for map meta-data, and a subsequent request for an associated map at a map server, will now be described in further detail with reference to FIG. 5.

In a first step 5:1, the map server receives a request for map meta-data from a user device and location data provided in one or two messages, where the request triggers a search for map meta-data at a map meta-data database, as indicated in a next step 5:2. In case step 5:2 does not result in a match, the map server is configured to retrieve available map criteria, and to provide the available map criteria to the user device, as indicated in the steps 5:4 and 5:5, thereby enabling the user device to provide a revised request to the map server, by repeating repeated steps 5:1-5:3 with the revised request. The process described with steps 5:4 and 5:5 may be executed according to the flow chart of FIG. 4. As an alternative to steps 5:4 and 5:5, the end-user may be informed that no match is found for the given request and be given an option to repeat the requesting process by making a new search, but without having any available map criteria to consider, i.e. without executing steps 5:4 and 5:5, respectively, before commencing with step 5:1 once again, or else the process may be terminated at the user device.

Once matching map meta-data has been found in the map meta-data database in step 5:3, the process continues by retrieving matching map meta-data from the map meta-data database, as indicated in a subsequent step 5:6, and by providing this map meta-data to the user device, as indicated in a next step 5:7.

Subsequent to providing map meta-data to the user device, and subsequent to a choice of map at the user device, the map server will receive a request for the selected map, as indicated in a step 5:8, which triggers the map server to acquire the requested map from a map database, and to provide the map to the user device, as indicated in steps 5:9 and 5:10, respectively, before the process is terminated. As already mentioned above, a client residing on the user device and capable of executing the described process may be configured to repeat the process in case the acquired map does not meet the expectations. In the latter case step 5:10 may also include a triggering at the user device to initiate a manual or automatic dialogue between the user device and the map server, which enables the user device to initiate a repeated process for requesting new map meta-data, or to request another map based on already available map meta-data.

A corresponding method, which is instead executed by a client running on a user device and capable of connecting to the map server and of requesting a map on the basis of map meta-data whenever required, will now be described in further detail with reference to FIG. 6.

Figure 6:
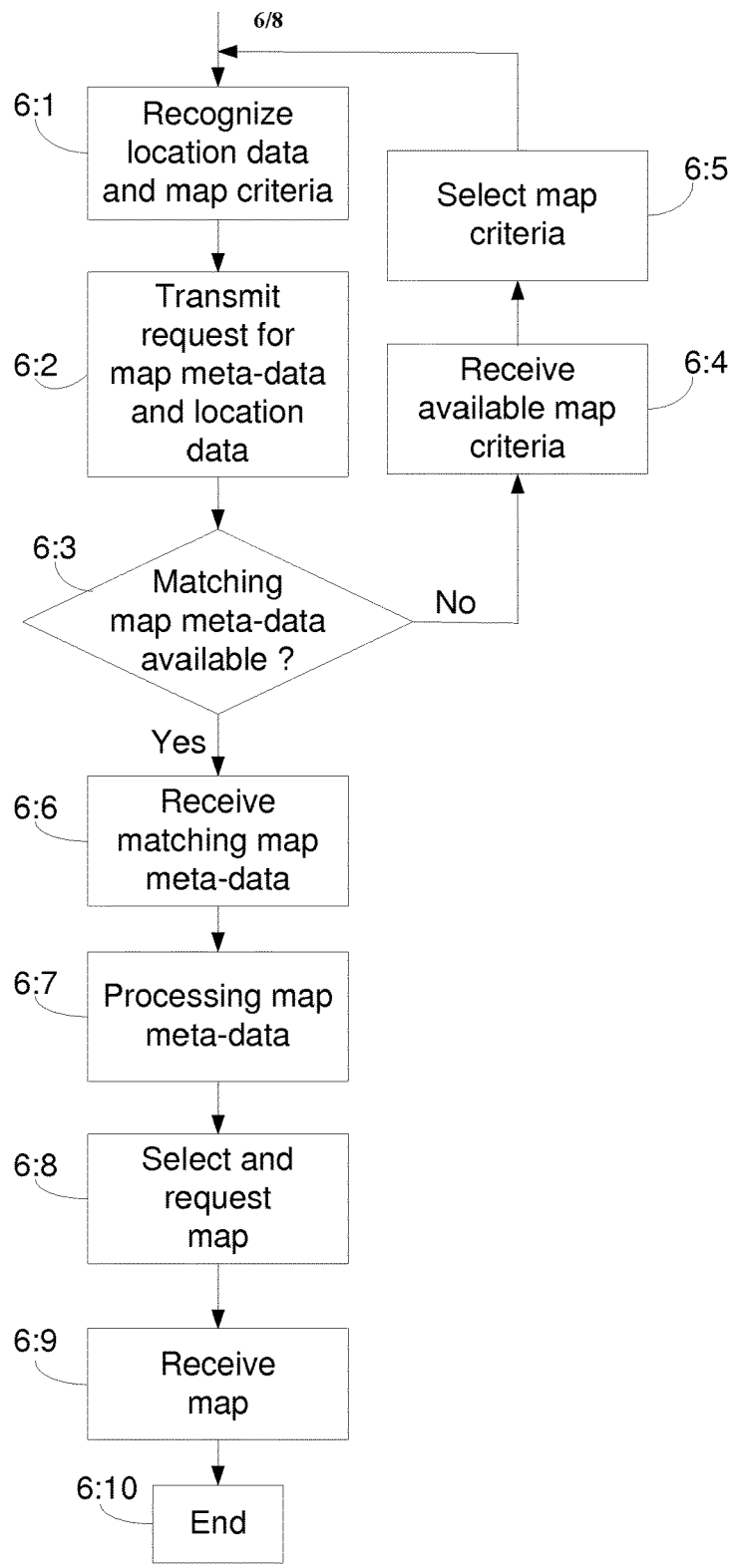
FIG. 6 is another flow chart illustrating a method, executed at a user device, for requesting maps, according to one embodiment.

According to FIG. 6 a process for acquiring map meta-data is triggered by a client running on the user device, recognizing location data and map criteria, as indicated in a first step 6:1, where the location data and map criteria which may have been entered either manually into the user device, or generated automatically by the client, or by a combination of both.

In response to recognizing the location data and map criteria, a request for map meta-data is assembled and transmitted to the map server either together with location data, or as separate messages, as indicated in a subsequent step 6:2.

If the request results in that no matching map meta-data is found in the map meta-data database, the user device will receive available map criteria instead of map meta-data, as indicated in a step 6:4, and the retrieved map criteria is made available to the user device, such that one or more map criteria can be selected, either by an end-user, or automatically, as indicated in step 6:5. The available map criteria may be obtained e.g. as indicated in step 5:4 of FIG. 5. Typically the processing comprises presentation of the available map criteria to the end-user, such that the end-user can easily select how to proceed in the initiated search, in case a manual search is being executed. In case of an automatic search executed by a client of the user device, an algorithm optimized for obtaining the most useful map meta-data available under the present circumstances will be executed. Such an automated process may also include the initiation of a manual sub-process, such that if the automated process does not result in the expected result, a manual dialogue may commence where the end-user continue by entering new input data for a new request. Alternatively, the user device may receive only an indication that no matching map meta-data was found, after which a new request may be provided to the map server from the user device, without the user device being notified of any available map criteria, or else the process may be terminated.

If instead the request, which may be a repeated request, results in a match between map meta-data and the map criteria, as executed in step 6:3, the user device will receive the matching map meta-data, as indicated in another step 6:6, and the acquired map meta-data can be processed accordingly, such that it is made available at the user device for manual or automatic selection of one or more maps, as indicated in a subsequent step 6:7.

Once the map meta-data has been made available to form a basis for a selection and requesting of one or more maps from the map server, a selection can take place, as indicated in a next step 6:8, and the requested map is subsequently received in another step 6:9, before the process is terminated, as indicated in a final step 6:10.

Figure 7:
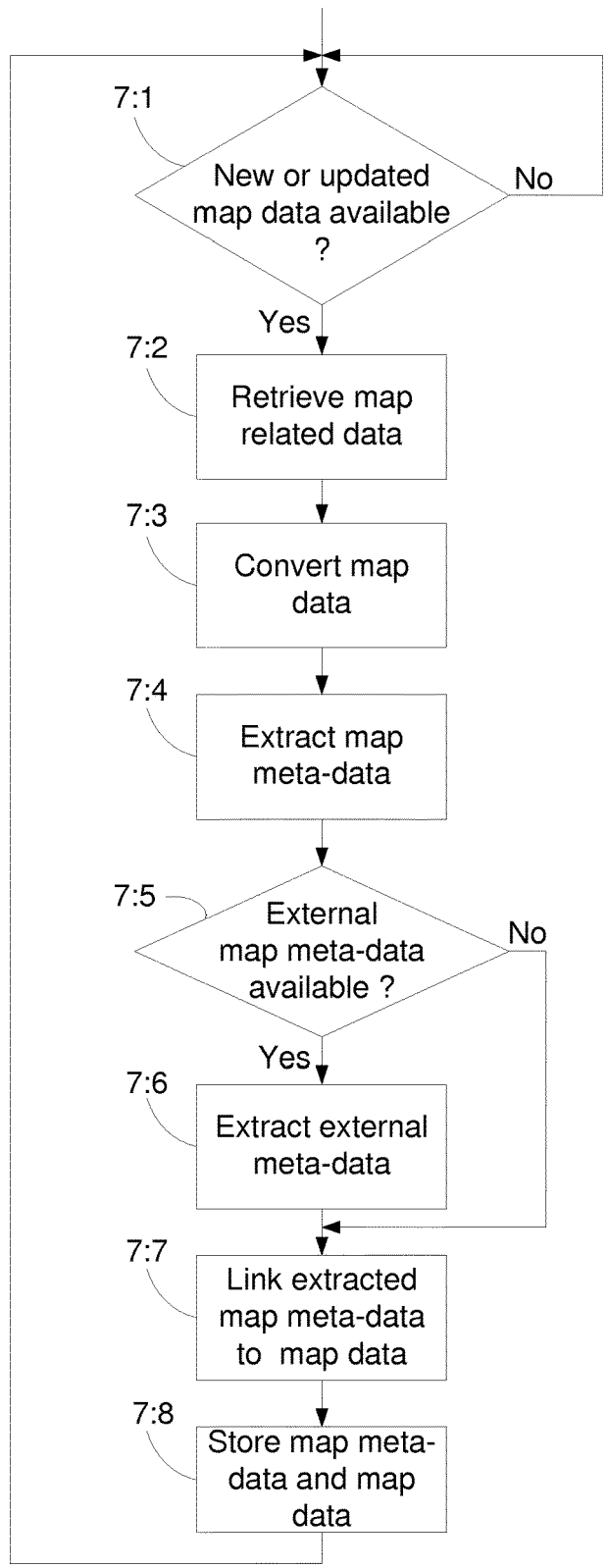
FIG. 7 is yet another flow chart illustrating a method, executed at a map processing engine, for managing and updating map related data in a map providing system, according to one embodiment.

The methods described above both rely on map meta-data and associated map data being available to, and kept updated at respective databases, from where it is made accessible via the map server. A method for assembling and managing such data from various sources will now be described in further detail below, with reference to FIG. 7. The method for assembling and managing map meta-data and map data is here executed by a map processing engine, such as the one mentioned above with reference to FIG. 2, or by any other server having corresponding functionality. The method of FIG. 7 is typically configured as a process which is repeated such that the map data and map meta-data is continuously updated whenever new data is available at any connected data source. Such an occurrence is determined in a first step 7:1 of the process.

According to one embodiment, updating may be repeated at a pre-defined time interval, such that available sources are repeatedly polled for updated data, or updated data is being pushed to the map processing engine at regular time intervals.

According to another embodiment, updating is controlled by one or more pre-defined triggering event, such as e.g. the addition or updating of a new map in a map data source, or of new user statistics in a map meta-data source. Alternatively, a combination of the two alternatives may be applied.

In a next step 7:2 updated map related data, i.e. map meta-data and/or map data is retrieved by the map processing engine, which process the retrieved data by converting the data from the used proprietary format into a common format, as indicated in a next step 7:3. Thereby, map related data originating from different providers which may use different formats may be used. For this purpose any type of format which is suitable for storing map related data may be selected.

One possible format is e.g. Open Street Map which is describe at http://wiki.openstreetmap.org/wiki/Indoor Mapping, while another format which may be used as a common format is KLM, described at http://code.google.com/apis/kml/documentation/kml_tut.html).

In case of retrieved map data, any tagged map meta-data is then extracted from the map data, as indicated in a subsequent step 7:4. Which map meta-data to extract from the map data is typically based on a list, the content of which may typically differ between different types of maps and may include data, such as e.g. the date of creation, the author, access rights, data size, map name, supported language, map type, included POIs and/or key words or tags identified in the map data. Alternatively, the described updating procedure may include an update of map meta-data only, in which case step 7:1 is followed by step 7:5, Step 7:5 illustrates how a check can be executed to determine whether any external map meta-data is available in association with updating of map data/map meta-data. If this is the case, relevant external map meta-data is extracted, as indicated in subsequent step 7:6.

Once at least some kind of map related data has been extracted, as suggested above, the map related data is compiled such that any extracted map meta-data is being linked or mapped to associated map data, as indicated in a step 7:7, where the related map data may be updated map data, or previously retrieved map data. Once the compilation of the retrieved data has been successfully executed, resulting in a linking between map meta-data and associated map data, the map data is stored in a map database and any associated map meta-data is stored in a map meta-data database, such that the respective data is made accessible via a map server connected to the two databases.

Since different types of data may be updated according to different updating rules, it is to be understood that a plurality of updating processes, such as the one described above, with reference to FIG. 7 may be executed in parallel, such that e.g. one or more processes are run for each data source. Thereby, the map database and map meta-data database may both be kept up to date with the latest map related data.

As already mentioned above, one advantage with the described map providing mechanism is that access to a plurality of maps, which may be provided from a plurality of providers is provided from one single access point, which in the described context is referred to as a map server. One possible configuration of such a server will now be described in further detail below with reference to FIG. 8.

The map server 28 comprises a processor 80 which is connected to a memory 81*a* which is capable of storing a computer program 82, made up of instructions, in the form of computer readable code, which when executed by the processor 80 causes the processor 80 to execute a process, which could be referred to as a map retrieving process or method, such as the method described above with reference to FIG. 5. The processor 80 may e.g. be a DSP (Digital Signal Processor) or a CPU (Central Processing Unit). Alternatively, a plurality of processors may be capable of executing the described process.

The map server 28 also comprises communication means which enables communication between the map server 28, the map database, the map meta-data database and user devices (not shown). In FIG. 8 such communication means is represented by communication means 88 and 89, but another number of communication means may alternatively be used, depending on the access capabilities of the map server. Any type of suitable communication means may be used, but by way of example, communication means capable of providing access to the map database and map meta-data database may be provided e.g. by applying a Java EE platform, while the communication means may e.g. be configured to provide access to user devices over HTTP.

The computer program 82 is typically divided into one or more modules. Instructions stored on the map server 28 are configured such that when executed by the processor 80 they cause the processor 80 to search for map meta-data matching location data and map criteria in a map database accessible to the map server 28, upon recognizing map meta-data and location data, received from a user device via any of the communication means 88,89 either as a separate request or provided in two separate messages. The matching may be referred to as a filtering process where map meta-data associated with the given location and associated with the given map criteria is filtered out.

According to one embodiment, the map server of FIG. 8 comprises a module, referred to as a meta-data retrieving module 84, which hosts such instructions in addition to instructions capable of instructing the processor 80 to retrieve, in case of at least one match between the map meta-data, the location data and the map criteria, from a map meta-data database, map meta-data associated with each matching map, and to provide the retrieved map meta-data to the user device. A map data retrieving module 85 comprises instructions to cause the processor 80 to retrieve map data from a map database in response to the map server 28 having received such a request via any of the available communication means 88,89. The processor 80 may also be capable of executing instructions to retrieve available map criteria, in case a request for map meta-data does not result in a match. Such instructions may be stored in a module, referred to as a map criteria retrieving module 86.

The map server 28 will typically also comprise an API, which is adapted to enable user friendly access to the described map service. Such an API may e.g. be referred to as a common indoor map API 87, since the presented application is suitable for managing selection of indoor maps. The API 87 may e.g. be a RESTful Application Programming Interface. In addition, the map server 28 may comprise a further memory 81*b* which may contain lists, listing map criteria which is available for various applications, to be used when a request result in no match. Alternatively, such lists may be stored in memory 81*a*. The memory 81*a* may be a stationary memory, or, a non-volatile memory, such as e.g. a flash memory, an EEPROM (Electrically Erasable Programmable Read-Only Memory) forming part of a computer program product 82, or a memory, readable by a disc drive, which is connectable to the processor 80.

A user device which is capable of hosting a client capable of providing map selecting functionality corresponding to the one described above via a map server, such as the one described above with reference to FIG. 8 will now be described in detail with reference to FIG. 9. Without any limitation, the user device which can be used for selecting maps as suggested above may e.g. be any of: a mobile telephone, which may typically be a smart phone, a tablet, a desktop, a laptop, a notebook, a personal video recorder, a multimedia player, a set-top box, a TV, a computers, or any other type of entity on which a client is capable of accessing a map server.

Figure 9:
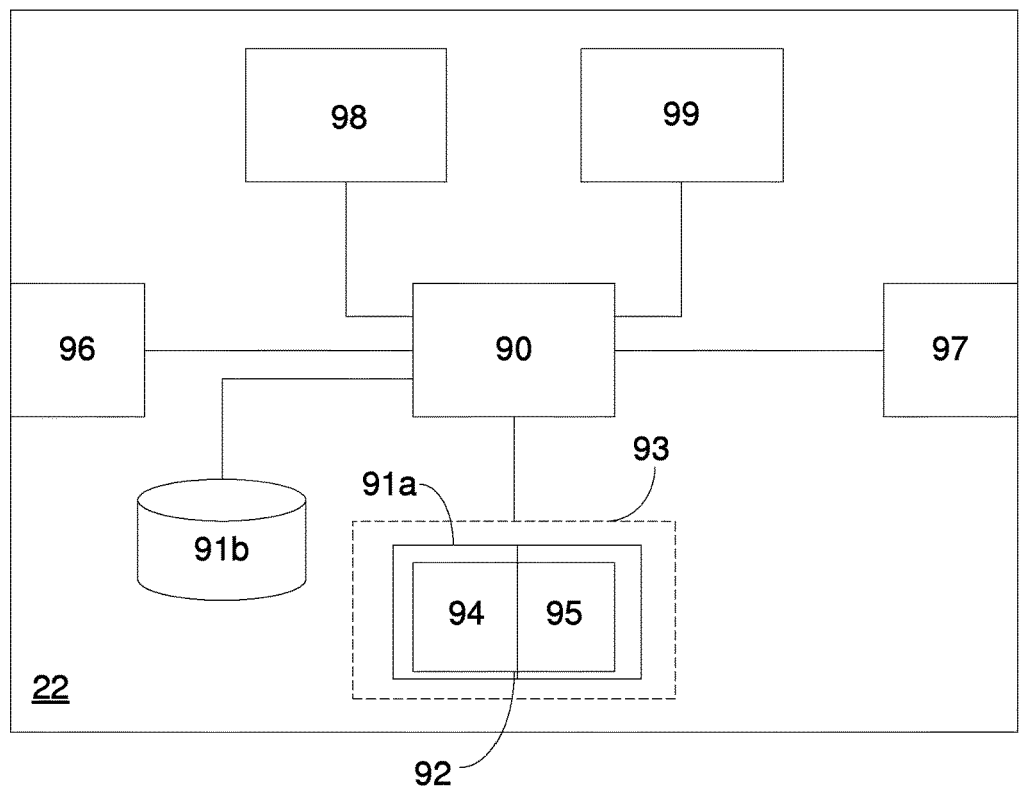
FIG. 9 is another simplified architecture, illustrating a user device, according to one embodiment.

The user device 22 of FIG. 9 comprises a processor 90 and a memory 91*a* which is capable of storing a computer program 92 made up of instructions, in the form of computer readable code, which when executed by the processor 90 causes the processor 90 to execute a process or method which corresponds to the method described above with reference to FIG. 6. The processor 90 may e.g. be a DSP or a CPU. Alternatively, a plurality of processors may be capable of executing the described method.

The computer program 92, which is typically arranged as comprising one or more modules, is arranged such that when executed by the processor 90 the instructions of the computer program 92 causes the processor 90 to recognize location data, specifying the location of the user device 22, and map criteria, specifying at least one condition for selecting a map to transmit the map criteria and location data, either in one request or separately to a map server capable of accessing maps from a map database, thereby initiating, a search for map meta-data matching the location data and the map criteria at the map server, and to receive map meta-data associated with each match from the map server, in case of at least one match between the location data and the map criteria.

Such instructions may, according to one embodiment, be contained in a map meta-data requesting module 94, as suggested in FIG. 9. The processor 90 is also configured to acquire map data in response to receiving a request for map data, after map meta-data has been provided to the user device 22. For that purpose FIG. 9 is also provided with a map selecting module 95 containing such instructions.

The computer program 92 may be configured as a computer program product 93, where memory 91*a* is a non-volatile memory, such as e.g. a flash memory or an EEPROM, which is connectable to the processor 90.

The user device 22 also comprises communication means for enabling communication between the user device 22 and a map server as well as between the user device 22 and a Usage Feedback server or any other server capable of collecting data associated with usage of map related applications, e.g. via HTTP. In FIG. 9, such means are represented by communication means 96 and 97. In addition, user device 22 also comprises a UI (user interface) 98, which may be any type of UI which enables a user to initiate and execute a process for selecting one or more maps, such as the one described above, which may include a dialogue established between the user device and the map server. The user device 22 also comprises a display 99 for presenting received map meta-data, map data, as well as instructions associated with dialogues configured to assist an end-user to make the optimal choice during selection of map meta-data and maps.

The map meta-data requesting module 94 may also comprise instructions which when run by the processor causes the processor to receive map criteria relevant for the indicated location from the map server or from retrieving location data from a any means suitable for providing such information, such as e.g. a GPS (not shown), and to process the relevant map criteria accordingly such that an end-user can repeat a request for map meta-data on the basis of the location data and any of the relevant map criteria, in case a previous request for map meta-data results in no match.

Furthermore, any of the mentioned modules may comprise instructions which when executed by the processor 90 causes the processor 90 to initiate a dialogue between the user device 22 and the map server subsequent to recognizing a match, thereby enabling for an end-user of the user device 22 to interact in the map selection via the established dialogue. These instructions may e.g. be executed upon recognizing the occurrence of at least one pre-defined dialogue triggering event.

In addition, memory 91a, or any other separate memory, here represented by memory 91b, may be configured to store map criteria available for respective applications.

Figure 10:
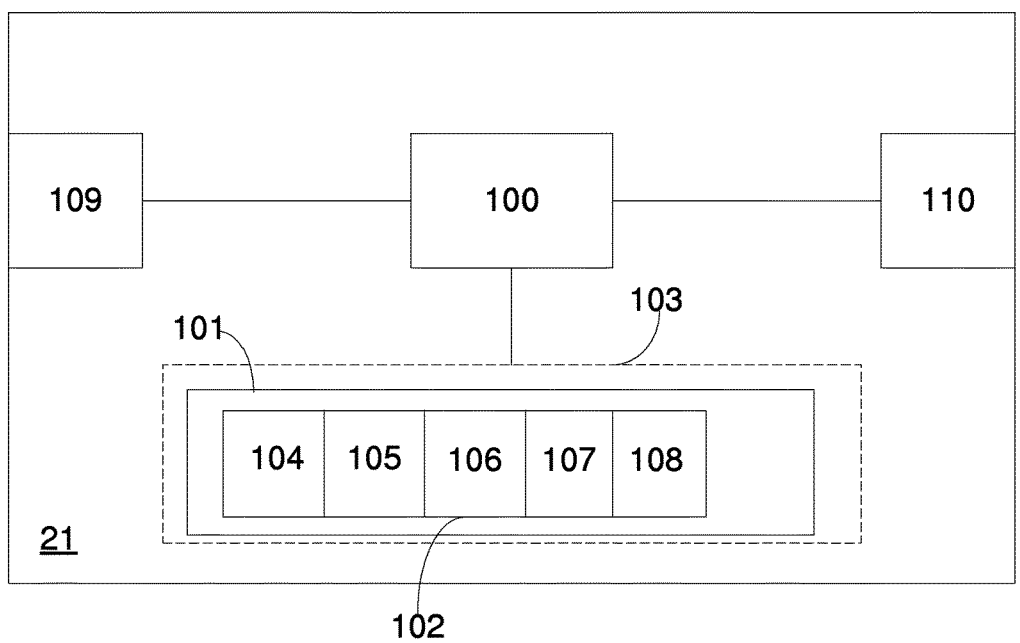
FIG. 10 is yet another simplified architecture, illustrating a map processing engine, according to one embodiment.

In order to be able to provide map data and map meta-data, a server capable of collecting and managing such data is required. A map processing engine suitable for managing such tasks will now be described in further detail with reference to FIG. 10.

The map processing engine 21 which may e.g. be implemented on a Glassfish server, comprises a processor 100 and a memory 101 which is capable of storing a computer program 102, made up of instructions, in the form of computer readable code, which when executed by the processor 100 causes the processor 100 to execute an updating process or method which corresponds to the method described above with reference to FIG. 7. The processor 100 may e.g. be a DSP or a CPU. Alternatively, a plurality of processors may be capable of executing the described method.

The computer program 102 typically comprises one or more modules. According to one embodiment, the computer program is capable of causing the processor 100 to retrieve updated or new map data, from at least one map data source by executing instructions contained in a module, here referred to as a map data retrieving module 104, to activate instructions of a data converting module 105 to convert the retrieved map data into a common data format, and to activate a map meta-data extracting module 106 to selectively extract, from at least one of a map meta-data source and the map data source, map meta-data associated with retrieved map data. A mapping module 107 holds instructions which when activated by the processor 100 causes the processor 100 to map acquired map meta-data with associated map data, while a storing module 108 holds instructions, which are capable of instructing the processor 100 to store mapped map related data in a respective database. During mapping the map meta-data is compiled such that it will later be searchable via various combinations of map criteria.

The compilation of map meta-data may comprise the building of sets of text strings that are associated with a respective map such that they can later be used for free text search of the stored maps. These text strings may contain any type of data but typical examples could e.g. be "emergency", "fire", "shopping", "McDonalds", or "Conference". The map meta-data may alternatively comprise a set of specific attributes that are set. These attributes could be any type of information and are configured according to the types of queries that the system should be able to handle. Typical examples include "date of creation=2011-10-25", "map provider=Ericsson", and "valid time of day=08:00-17:00". Both the text strings and the specified attributes could either be set manually or automatically extracted from the map data or from any other external source.

The computer program 102 may be stored on a memory 91a which may be a stationary memory or a memory which form part of a computer program product 103, where, in the latter case, the memory 91a may be a non-volatile memory, such as e.g. a flash memory, an EEPROM, or a memory readable by a disc drive which is connectable to the processor 100.

In addition, the map processing engine 21 comprises communication means, here represented by communication means 109 and 110. Any type of communication means which enables the map processing engine to communicate with map meta-data sources and map data sources may be used. By way of example, communication means which enables the map processing engine 21 to communicate with map data sources via e.g. Java EE and/or HTTP may be used.

The instructions contained in the map data retrieving module 104 may be configured to cause the processor 100 to repeatedly retrieve new or updated map data and/or map meta-data at a pre-defined time interval, upon recognizing the occurrence of at least one pre-defined map triggering event. Alternatively a combination of the two alternatives may be applied. Different sources may also be updated differently, by executing separate updating processes in parallel.

It is to be understood that all the implementation embodiments suggested above are to be seen as non limiting simplified examples of possible implementations, where software and/or hardware which may normally be included in this type of servers may have been omitted unless found necessary for illustrating functionality directly associated with the handling of map related data as described in the embodiments put forward above.

It is also to be understood that the naming of entities, such as e.g. map processing engine, map server and usage feedback server, as well as modules, such as e.g. map data retrieving module and meta-data extracting module are to be seen as non limiting examples which may be replaced by alternative entities or modules which provide the corresponding functionality.

Furthermore, the arrangements of modules described above which are configured to interact accordingly, merely serve as non limiting examples on how functionality of the respective units may be arranged. Other alternative configurations and combinations may replace the suggested ones as long as corresponding functionality can be obtained.

The invention claimed is:

1. A method executed in a map server for enabling selection of maps at a user device, the method comprising:
    receiving, from the user device, a request for map meta-data, the request comprising at least one map criterion, specifying at least one map selecting condition, and location data, indicating the location of the user device;
    searching, in a map meta-data database, for map meta-data matching the received location data and the at least one map criterion;
    retrieving, from the map meta-data database, map meta-data associated with at least one map, in the event of at least one match between the map meta-data, the location data and the at least one map criterion, and otherwise,
    in the event of no match between map meta-data, the location data, and the at least one map criterion:
        retrieving map criteria available for the indicated location,
        the map server providing the available map criteria to the user device, receiving, from the user device, a repeated request for map meta-data, wherein the request comprises at least one map criterion, selected by the user device from the available map criteria, and
retrieving map meta-data associated with at least one map based on the at least one selected map criterion and the location data;
providing the retrieved map meta-data to the user device, thereby enabling the user device to automatically select, from a map database, via the map server, at least one map, at least partly on the basis of the retrieved map meta-data;
receiving, from the user device, a request for a selected map;
acquiring the requested map from the map database; and
providing the selected map to the user device.

2. A method executed by a user device for retrieving maps from a map server, the method comprising:
recognizing location data, specifying the location of the user device, and at least one map criterion, specifying at least one map selecting condition;
transmitting, to a map server capable of accessing maps from a map database, a request for map meta-data, the request comprising the at least one map criterion, and the location data, thereby initiating, at the map server, a search for map meta-data matching the location data and the at least one map criterion;
receiving from the map server, in response to there being no match between the location data and the at least one map criterion in the request and map meta-data at the map server, map criteria available for the indicated location;
recognizing at least one selected map criterion from the available map criteria;
transmitting a repeated request for map meta-data on the basis of the location data and the at least one selected map criterion;
receiving, from the map server, map meta-data associated with at least one map;
selecting, at least partly on the basis of the received map meta-data, and requesting from the map server, at least one map; and
receiving the at least one requested map from the map server.

3. The method of claim 2, further comprising, subsequently to receiving map meta-data, processing the map meta-data and initiating a dialogue between the user device and the map server, thereby enabling a user of the user device to interact with the map server and to select and request at least one map via the dialogue.

4. The method of claim 2, further comprising, subsequently to receiving matching map meta-data, processing the map meta-data such that at least one map can be automatically selected and requested by the user device.

5. A map server comprising:
a processor and
a memory operatively connected to the processor and storing computer program instructions that, when executed by the processor, cause the processor to:
recognize a request for map meta-data, received from a user device, the request
comprising at least one map criterion specifying at least one map selecting condition, and location data, indicating the location of the user device;
search, in a map database accessible to the map server, for map meta-data matching the
location data and the at least one map criterion;
retrieve, from a map meta-data database, map meta-data associated with at least one map, in the event of at least one match between the map meta-data, the location data and the at least one map criterion, and otherwise,
in response to finding no match between the map meta-data, the location data and the at least one map criterion:
retrieve map criteria available for the indicated location,
send the map criteria to the user device,
receive, from the user device, a repeated request for map meta-data, wherein the request comprises at least one map criterion, selected by the user device from the available map criteria, and
retrieve map meta-data associated with at least one map based on the at least one selected map criterion and the location data;
provide the retrieved map meta-data to the user device;
receive, from the user device, a request for at least one map, selected at least partly on the basis of the map meta-data;
acquire, from a map database, the at least one requested map; and
provide the at least one requested map to the user device.

6. The map server of claim 5, the memory further storing computer-readable instructions that when executed by the processor cause the processor to make an Application Programming Interface accessible to the user device, thereby enabling for the user device to communicate with the map server and to request map meta-data and maps via the Application Programming Interface.

7. The map server of claim 6, wherein the Application Programming Interface is a RESTful Application Programming Interface.

8. A non-transitory computer-readable medium comprising a computer program stored thereupon, the computer program comprising instructions that, when executed on a processor of a map server, are configured to cause the processor to:
recognize a request for map meta-data, received from a user device, the request
comprising at least one map criterion, specifying at least one map selecting condition, and location data, indicating the location of the user device;
search, in a map database accessible to the map server, for map meta-data matching the
location data and the at least one map criterion;
retrieve, from a map meta-data database, map meta-data associated with at least one map, in the event of at least one match between the map meta-data, the location data and the at least one map criterion, and otherwise,
in response to finding no match between the map meta-data, the location data and the at least one map criterion:
retrieve map criteria available for the indicated location,
send the map criteria to the user device,
receive, from the user device, a repeated request for map meta-data, wherein the request comprises at least one map criterion, selected by the user device from the available map criteria, and
retrieve map meta-data associated with at least one map based on the at least one selected map criterion and the location data;
provide the retrieved map meta-data to the user device;
receive, from the user device, a request for at least one map, selected at least partly on the basis of the map meta-data;
acquire, from a map database, the at least one requested map; and
provide the at least one requested map to the user device.

9. A user device comprising:
a processor and
a memory operatively connected to the processor and storing instructions that, when executed by the processor, cause the processor to:
recognize location data, specifying the location of the user device, and at least one map criterion, specifying at least one map selecting condition;
transmit, to a map server capable of accessing maps from a map database, a request for map related map meta-data, the request comprising the at least one map criterion, and the location data, thereby initiating, at the map server, a search for map meta-data matching the location data and the at least one map criterion;
receive, from the map server, in response to there being no match between the location data and the at least one map criterion in the request and map meta-data at the map server, map criteria available for the indicated location;
recognize at least one selected map criterion from the available map criteria; and
transmit a repeated request for map meta-data on the basis of the location data and the at least one selected map criterion;
receive, from the map server, map meta-data associated with at least one map;
select, at least partly on the basis of the received map meta-data, and request from the map server, at least one map; and
receive the at least one requested map from the map server.

10. The user device of claim 9, the memory further storing instructions that when executed by the processor cause the processor to process the map-meta-data and to initiate a dialogue between the user device and the map server subsequently to receiving map meta-data, thereby enabling an end-user of the user device to interact with the map server and to select and request at least one map via the dialogue.

11. The user device of claim 10, the memory storing instructions that when executed by the processor cause the processor to initiate the dialogue upon recognizing the occurrence of at least one pre-defined dialogue triggering event.

12. The user device according to of claim 10, wherein the user device is any of: a mobile telephone, a smart phone, a tablet, a desktop, a laptop, a notebook, a multimedia player, a set-top box, a TV and a computer.

13. A non-transitory computer-readable medium comprising a computer program stored thereupon, the computer program comprising instructions that, when executed on a processor of a user device, cause the processor to:
recognize location data, specifying the location of the user device, and at least one map criterion, specifying at least one map selecting condition;
transmit, to a map server capable of accessing maps from a map database, a request for
map related map meta-data, the request comprising the at least one map criterion, and the location data, thereby initiating, at the map server, a search for map meta-data matching the location data and the at least one map criterion;
receive, from the map server, in response to there being no match between the location data and the at least one map criterion in the request and map meta-data at the map server, map criteria available for the indicated location;
recognize at least one selected map criterion from the available map criteria; and
transmit a repeated request for map meta-data on the basis of the location data and the at least one selected map criterion;
receive, from the map server, map meta-data associated with at least one map;
select, at least partly on the basis of the received map meta-data, and request, from the map server, at least one map; and
receive the at least one requested map from the map server.

* * * * *